United States Patent [19]

Fascenelli, Jr. et al.

[11] Patent Number: 5,690,365

[45] Date of Patent: Nov. 25, 1997

[54] PET IDENTIFICATION TAGS

[76] Inventors: Frederick W. Fascenelli, Jr.; Cynthia F. Kirkeby, both of 696 N. Lemon Hill Trail, Orange, Calif. 92669

[21] Appl. No.: 657,380

[22] Filed: Jun. 3, 1996

[51] Int. Cl.[6] .................................................. B42D 15/00
[52] U.S. Cl. .................................. 283/67; 283/74; 283/75
[58] Field of Search .............................. 283/74, 75, 67, 283/70, 107, 109, 117, 904; 156/83, 81, 84, 85; 101/474, 487, 488

[56] References Cited

U.S. PATENT DOCUMENTS 4,892,335  1/1990  Taft ........................................... 283/75
5,305,538  4/1994  Kanzelbergen ........................ 283/74 R
5,380,046  1/1995  Stephens ................................... 283/75
5,464,254  11/1995  Campbell et al. ..................... 283/75 X

*Primary Examiner*—Willmon Fridie, Jr.
*Attorney, Agent, or Firm*—G. Donald Weber, Jr.

[57] ABSTRACT

Pet identification tags and the method of making same. The consumer applies the pet identification information on the tag base. The tag base is then baked for five minutes. After the baking period, the tag base is cooled. The process produces a hard plastic I.D. tag for a pet.

11 Claims, 1 Drawing Sheet

PET IDENTIFICATION TAGS

BACKGROUND

1. Field of the Invention

The invention relates to identification tags for pets, in general, and to a quick and easy way to make customized tags which are printed with colorful characters, in particular.

2. Prior Art

There are many needs for identification tags. Such tags can be used with pets, as well as other belongings. These tags can be made of various materials such as metal, plastic or the like.

Metal tags tend to be difficult to produce. That is, special equipment is required to etch or engrave the identification information onto the tag. The individuality of metal tags is somewhat limited, for example to shape and/or the color of the metal. Moreover, metal tags tend to become scratched and difficult to read.

Most plastic tags known in the art are merely "change-of-material" variations. The shapes and colors of plastic tags may be more varied than metal tags, however.

In addition, under the prior practice, consumers had to fill out a form, write a check and mail the information to a supplier which made the tag. Ten days later (perhaps), the tag would be delivered to the consumer. Thus, there was an inconvenience and a substantial delay before the tag was available.

SUMMARY OF THE INSTANT INVENTION

This invention relates to pet identification tags which can be fabricated from kits sold at retail stores at point of purchase displays. The consumer purchases the kit, places the pet identification information onto the tag, bakes the tag for five minutes, and allows the tag to cool. A connector device is then attached to the tag. At the end of the process, the consumer has a hard plastic I.D. tag for the pet.

DESCRIPTION OF A PREFERRED EMBODIMENT

Figure 1:
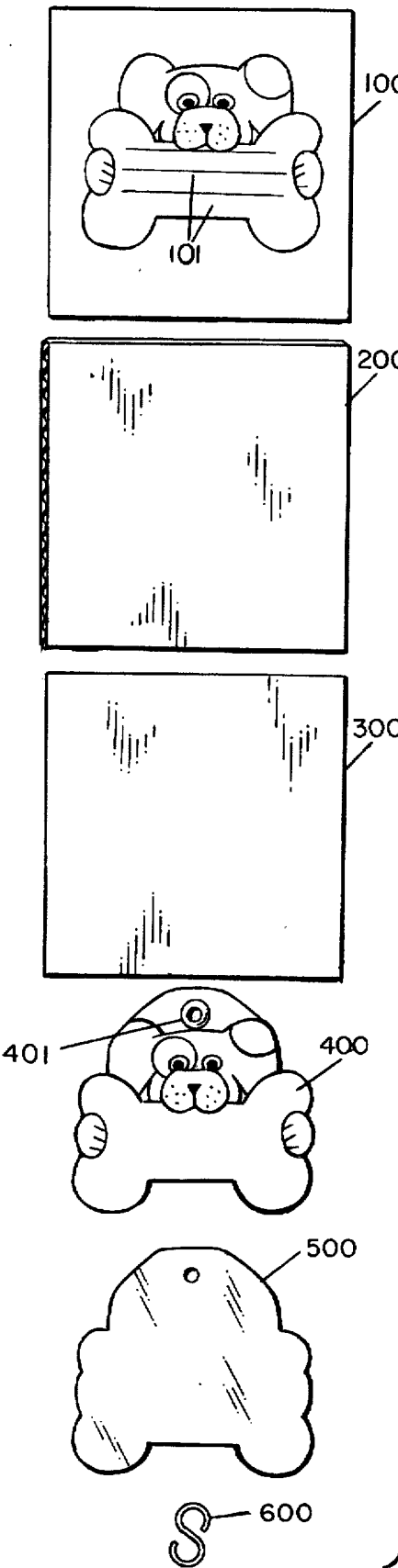
FIG. 1 is a view of the components of a kit used to implement the identification tag of the instant invention.

Referring now to FIG. 1, there is shown a composite view of the components of a kit used to implement the instant invention. The components of the kit include a template 100, a baking support 200, a release liner 300, a tag 400, a vinyl laminate 500 and a hook 600.

The template 100 is an ordinary piece of paper with an outline of the identification tag 400 thereon. The outline of the tag and a plurality of construction lines 101 are printed on the template sheet. The size of the test template can vary. In a preferred embodiment, the template sheet is about 3½ inches square. The construction lines are provided so that the information printed thereon by the user is appropriately sized so as to be readable after the tag is reduced in size as described infra.

The baking board support 200, in one embodiment, comprises a piece of 125 lb, B-flute, number one cardboard which is about 3½"×3½"×1/16".

The release liner 300 is also about 3"×3". One suitable example is sold under the trade name Laser Plus™ and comprises paper which has a very light wax coating on the back thereof.

In the preferred embodiment, tag is 400 fabricated of fifteen (15) mil, oriented polystyrene (O.P.S.). The material is printed on one surface with a waxfree ink which is high in solvent content. This ink is printed in any suitable and/or selected design such as the outline of a pet or the like. The tags are die cut using a suitable press to form any desired shape. In one preferred embodiment, the tag 400 is about 3"×3". A suitable grommet or eyelet 401 is provided in the tag at a convenient location.

A thin layer 500 of clear plastic is placed over the surface of tag 400 to protect the surface thereof.

The hook 600 is, typically, an S-shaped metal hook which can be attached to the finished identification tag 400 and to the item to be identified, e.g. a pet collar.

Figure 2:
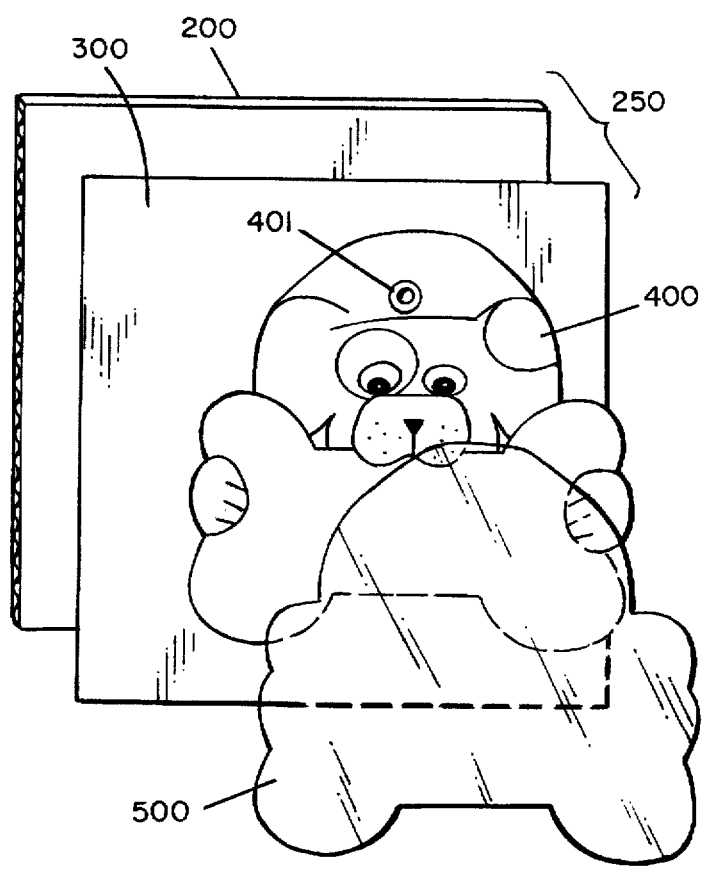
FIG. 2 is an exploded view of the components of the kit partially assembled to fabricate the identification tag of the instant invention.

Referring now to FIG. 2, there is shown an overlay view of components of the kit of instant invention. In particular, the consumer applies the appropriate information on tag 400 and then places tag 400 on the baking board 250. The baking board 250 consists of the release liner paper 300 and the cardboard support 200.

The inventive method of producing a completed tag is initiated by first practicing on the template 100. That is, the pertinent information is written on the template to check and/or experiment with regard to the size and the arrangement thereof. Also, the size of the written information is established.

To initiate the fabrication of the actual tag, the pertinent information is inscribed on the surface of tag 400 which is already imprinted with a suitable design as noted supra. A black permanent ink felt-tip pen is used for this task.

The release liner paper 300 is placed on the cardboard baking board support 200. These items, collectively are referred to as the baking board 250. After the oven has been pre-heated 300° F. for at least 10 minutes to 300° F. for a standard-sized oven, the baking board 250 is placed in the oven to preheat together for 1–2 minutes.

The baking board is preheated to allow for an even heating of the plastic material. The cardboard allows an even distribution of heat over the surface to allow for a uniformly finished product. The release liner 300 paper allows the tag to melt slightly without sticking to the support material.

The tag 400, with information written thereon, is placed face up on the preheated paper and cardboard baking board 250. The tag is then baked for 5 minutes at about 300° F. During the bake step, the solvent in the ink (with which the tag is printed) etches the plastic and ingrains the pigment into the material. In addition, the shrink characteristic of the tag is controlled and uniform wherein the finished product which is created is merely a smaller version of the tag 400. That is, virtually no distortion in the shape of the tag occurs during the shrinking process.

The components are then removed from the oven and allowed to cool for 5 minutes. The tag is peeled off the baking board 250 and S-hook 600 is attached through the metal (e.g. brass) eyelet 410 at the top of the tag 400. The tag can then be placed on the pet or other property.

Thereafter, a clear plastic layer 500 can be placed over the tag 400 to protect the tag from abuse or wear.

Figure 3:
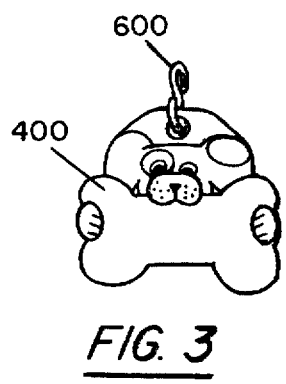
FIG. 3 is a plan view of one embodiment of the identification tag of the instant invention.

Referring now to FIG. 3, there is shown a plan view of one embodiment of an identification tag 400 formed of the materials noted above and by the method described. The finished tag, in one embodiment, is about 1" wide by about ¾" high and about 15 mils thick. The S-hook 500 is about ¾" long.

Thus, there is shown and described a unique design and concept of pet identification tags. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. A method for making a tag comprising, inscribing information in ink onto a uniformly heat shrinkable plastic body, placing said plastic body on a baking board, pre-heating said baking board to insure even heating of said plastic body during the subsequent heating step, said pre-heating is accomplished at about 300° F. for approximately 1 to 2 minutes, heating said plastic body to uniformly shrink said plastic body and to bake said ink into said plastic body, said heating is accomplished at about 300° F. for approximately 5 minutes, and applying a clear plastic protective layer to said plastic body.

2. A kit for making an identification tag comprising, a sheet of uniformly heat shrinkable plastic material, a baking board for supporting said sheet during heating thereof, and a release liner for inclusion between said sheet and said baking board during the heating thereof.

3. The kit recited in claim 2 including, attachment means for attaching the tag to an article.

4. The kit recited in claim 2 including, a thin clear plastic layer placed on said sheet.

5. The kit recited in claim 4 wherein, said baking board is formed of cardboard.

6. The kit recited in claim 2 wherein, said sheet is formed of an oriented polystyrene material.

7. The kit recited in claim 3 wherein, said attachment means comprises a hook means.

8. The kit recited in claim 3 including, an aperture through said sheet for receiving said attachment means.

9. The kit recited in claim 7 wherein, said hook means is formed in an S-shape.

10. The kit recite din claim 2 including, indicia disposed on said sheet.

11. A pet identification tag fabricated by the process of:

inscribing information in ink onto a plastic body which shrinks uniformly in response to the application of heat thereto, placing said plastic body on a baking board, pre-heating said baking board to about 300° F. for approximately 1 to 2 minutes in order to insure even heating of said plastic body during a subsequent heating step, heating said plastic body to about 300° F. for approximately 5 minutes in order to uniformly shrink said plastic body and to bake said ink into said plastic body, and applying a clear plastic protective layer to said plastic body after said plastic body has been shrunk to a desired size.

* * * * *